Patented Feb. 10, 1953

2,628,208

UNITED STATES PATENT OFFICE 2,628,208

COATING COMPOSITIONS

Serge A. Loukomsky, Hartford, Conn.

No Drawing. Application June 18, 1951,
Serial No. 232,240

21 Claims. (Cl. 260—32.8)

This invention relates to inks and coating materials for coating or printing on resin surfaces which possess selective adhesive properties. More particularly the invention relates to compositions for coating or printing on the unmodified surfaces of normally solid hydrocarbon polymers including polyethylene.

There has become available to industry a large group of solid hydrocarbon polymers such as polyethylene, the various vinylidene polymers and copolymers, the various synthetic rubbers, natural rubber, and the like which have essentially nonpolar surfaces. Only a small group of resins form films which are strongly adherent to the surfaces of these hydrocarbon polymers. Experience has demonstrated that the resins of this small group form films which may be attended by undesirable physical properties including poor resistance to solvents and abrasion, inadequate toughness, and low flexibility.

In the past, compositions for coating materials having selective adhesive properties such as the above listed polymers have been largely restricted to mutually compatible combinations of at least one resin capable of forming an adherent film and one or more additional resins, also compatible with the substrate which impart the desired physical properties to the film produced. The object of the formulator of these prior art coating compositions was to obtain a material which would form a dried film containing a single resin phase.

As a consequence of the necessity for mutual compatibility between the substrate and the plurality of resins employed, coating compositions for polyethylene and the like which have been developed by the prior art are not entirely satisfactory.

It is the primary object of the present invention to provide coating compositions containing substrate-incompatible resins which form films adherent to hydrocarbon polymer surfaces which have selective adhesive properties. As a consequence of the use of substrate-incompatible resin components in the compositions of this invention, films may be produced on polyethylene and similar surfaces which are characterized by substantially any desired physical properties.

More particularly the invention embraces a coating composition which consists essentially of a mixed solvent medium having a higher boiling fraction and a lower boiling fraction, a first resin dispersed in particulate form in said medium, and a second resin in solution is said medium; said first resin being compatible with the surface to be coated, soluble in the higher boiling fraction of said medium at an elevated temperature said second resin being incompatible with the surface to be coated, insoluble in the higher boiling fraction of said medium at any temperature, and soluble in said medium and in the lower boiling fraction thereof at a temperature substantially below that requisite to solution of said first resin in the higher boiling fraction of said medium. Said first resin is preferably insoluble in said medium and in the lower boiling fraction thereof.

Compatible resins, as embraced by this invention are those which form films strongly adherent to the surface to which the coating compositions of the invention are applied. Similarly, incompatible resins are those which do not form such adherent films.

It will be appreciated that the above described coating compositions embraced at least one resin capable of forming a film adherent to the surface to be coated, which resin is in dispersion, in particulate form, in a liquid medium comprising a solution of an additional resin in a mixed solvent of critical composition. The resin in solution is incompatible with the intended substrate and incompatible with the resin forming the solid phase of the dispersion.

In the coating processes in which the compositions of this invention are employed the substrate-compatible resin functions to bind the substrate-incompatible, non-adherent resin to the surface to which the coating compositions are applied. It is critical to the formation of satisfactory adherent films that at least a portion of the substrate-incompatible resin be deposited upon the surface being coated prior to the complete deposition of the substrate compatible resin.

Through the phenomenon of phase reversal the resin components of the coating compositions of this invention are deposited in the proper sequence when the compositions are utilized in the manner hereinafter described. That is the resin originally in solution is caused to precipitate out and thereafter the resin which originally formed the solid phase of the coating composition dispersion is brought into solution in a portion of the solvent medium. The successful utilization of substrate-incompatible resins in the compositions of this invention is attributable to this phase reversal process. The fact that the substrate-incompatible resin is not soluble in the last fraction of the solvent to be evaporated when the coating compositions are utilized coupled with the additional fact that the substrate-compatible resin is soluble in the last fraction of the solvent to be evaporated when the coating compositions of this invention are utilized permits the incorporation of a relatively high concentration of substrate-incompatible resins in the compositions of this invention without adverse effect on the strength of the bond to the substrate.

Utilization of the coating compositions of this invention entails the following combination of process steps:

(a) Deposition of a layer of the coating composition upon a substrate, e. g., polyethylene, (b) Volatilizing from the coated substrate at least a portion of the lower boiling fraction of the solvent medium of the coating composition to precipitate the resin originally in solution, which is incompatible with the substrate, (c) Raising the temperature of the coated substrate to a degree adequate to effect solution of the substrate compatible resin in the higher boiling fraction of the solvent medium, (d) Volatilizing the higher boiling fraction of the solvent medium to form a tough dry film.

The foregoing process steps normally are carried out successively. Certain of the steps are overlapping and to such extent may take place concurrently. For example, the freshly coated substrate may be subjected for a brief period of time to high temperatures to accomplish all the listed process steps. The temperature of the coated film will then increase progressively as evaporation of successive factions takes place. When the process is practiced in this manner volatilization of a portion of the higher boiling fraction of the solvent medium and solution of the substrate compatible resin take place concurrently. Likewise, volatilization of part of the lower boiling fraction of the solvent medium and precipitation of the substrate incompatible resin may occur concurrently.

It will be understood that the expression substrate is employed herein in its common connotation to embrace the base to which the coating compositions of the invention are applied.

To obtain phase reversal in the coating process it is critical that the coating composition of the invention contain a mixed solvent medium having a higher boiling fraction and a lower boiling fraction. It is desirable that there be a boiling point differential between the two fractions of the solvent medium of at least 10° C. Preferably, this boiling point differential between the components of the solvent medium is about 20° C. to about 50° C. Mixed solvents having much larger boiling point differentials between the higher and lower boiling fractions thereof can be employed.

It will be understood that the solvent media which can be employed in the coating compositions of this invention can embrace a multiplicity of individual ingredients. Generally speaking, it is preferable to employ a mixture boiling over a temperature range of 10 to 30 centigrade degrees for the lower boiling fraction. Mixtures of ketones, alcohols, ethers, and the like which boil over a range of 100° C. to 130° C. are highly suitable inasmuch as such materials are readily volatilized. The lower boiling fraction can constitute from about 15% to 50%, preferably 25% to 40% of the total weight of the coating compositions of the invention.

Similarly, a mixture of materials boiling over a range about 50 to 75 centigrade degrees is highly suitable as the higher boiling fraction of the solvent media of the invention. It is preferred that at least about 25% of the higher boiling fraction evaporate at a temperature substantially above the temperature requisite to solution therein of the substrate compatible resin, to facilitate bonding of the compatible resin to the substrate. For example, with resins of appropriate solubility characteristics, hydrocarbon or halogenated hydrocarbon mixtures boiling over a range of about 140° C. to 225° C., at least 25% of which boil at a temperature in excess of 160° C. have proved satisfactory. The higher boiling fraction may constitute from 50% to 75%, preferably from 60% to 65% of the total weight of the coating compositions of the invention.

It is further critical that the mixed solvent medium be a solvent for the substrate-incompatible resin component of the coating composition. Preferably the medium is a nonsolvent for the resin component of the coating compositions which is compatible with the substrate.

It is also critical that the lower-boiling fraction of the solvent medium be a solvent for the substrate-incompatible resin component.

It is also critical that the higher-boiling fraction of the solvent mixture be a solvent for the substrate-compatible resin component only at an elevated temperature. More specifically the higher boiling fraction of the solvent mixture should be a solvent for the substrate-compatible resin component only at a temperature substantially above the boiling point of the lower boiling fraction of the solvent medium to the end that the substrate-incompatible resin will be substantially completely precipitated prior to solution of the substrate-compatible resin component.

It is additionally critical that the coating compositions of the invention have dispersed in particulate form therein, a resin which is compatible with and capable of forming a film adherent to the intended substrate. In most instances it is highly suitable to utilize for this purpose the same resin as that from which the substrate is formed. Among other things the utilization of such a resin makes possible the use in the solvent medium of the coating compositions of a higher boiling fraction which will soften the substrate and improve the bond of the coating. Additionally, the utilization in the coating compositions of the same resin from which the intended substrate formed will result in a more homogeneous product.

It is critical that the coating compositions of this invention after drying contain at least about 50% by volume of resin compatible with the intended substrate. A preferable concentration before drying is from about 8% to about 20% of the weight of the coating composition. If the lower limit of about 18% is not observed adequate bonding of the incompatible resin to the substrate is not achieved. Utilization of an amount in excess of 20% by weight of the compatible resin in the coating compositions before drying is unnecessary, and may be precluded by viscosity considerations.

The compatible resin present in the coating composition of the invention, generally speaking, should have a particular size from about 0.2 to about 5 microns.

It is further critical that the coating compositions of this invention contain in solution at least one resin which is incompatible with the intended substrate. Such incompatible resins are availed of to impart to the ultimate films the desired physical properties. For example, films which are resistant to grease, solvents, abrasion, and which are characterized by a high degree of toughness and flexibility. Additionally, this incompatible component is availed of as a pigment carrier in the production of pigmented films.

It is critical that the incompatible resin be soluble in the mixed solvent medium of the coating composition and in the lower boiling fraction thereof. It is also critical that the incompatible resin be insoluble in the higher boiling fraction of the solvent medium. These properties of solubility are critical to the end that the necessary phase reversal will take place.

The weight ratio of the substrate-incompatible resin to the substrate-compatible resin present in the coating composition of the invention should fall within the range of about 1:1.2 to 1:5. If the weight ratio of compatible to incompatible resins exceeds 1:1.2, a satisfactory bond to the substrate is not obtained. If the ratio falls below about 1:5 the pigmentation is unsatisfactory in colored films.

Any of the conventional pigments may be employed to pigment the coating compositions of this invention. Such pigments include the phthalocyanine blues, the phthalocyanine green, the diazo pigments, titanium dioxide, rutile, ochre, sienna and the like. The pigments are preferably first dispersed in the substrate incompatible resin and subsequently incorporated into the composition by addition to the substrate-compatible resin dispersion.

The pigmented coating compositions of this invention are particularly appropriate for use as rotogravure inks for the reason that in the normal printing process the lower boiling fraction of the solvent medium is substantially completely volatilized. Accordingly, satisfactory printed surfaces, such as printed polyethylene may be obtained by printing the surface with the pigmented composition of this invention, and thereafter bonding the imprinted design to the substrate by subjecting the design to a temperature from about 150° F. to 175° F. The exposure of the printed surface to a blast of hot air, ranging in temperature from about 225° F. to about 300° F., for a period from about 0.5 to 5 seconds is generally satisfactory.

The printing so produced is not removed by normal attrition to which such printed material may be subjected. Furthermore, the printing is not removed or adversely affected by "stripping" tests in which a pressure-sensitive adhesive is applied to the printed surface and thereafter suddenly stripped off.

A salient feature of this invention resides in the production of grease-resistant inks or coating compositions for substrates such as polyethylene, copolymers of ethylene and other hydrocarbon, and the like. Compositions of this type normally embrace polyethylene as the substrate-compatible resin component and a vinyl resin, or a chlorinated rubber, which is insoluble in oils, fats, and hydrocarbons, as a substrate-incompatible resin component vinyl resins having a molecular weight of from about 10,000 to about 15,000 may be employed. It is highly suitable to employ in these coating materials, compatible resins of the same chemical composition as the intended substrate.

Polyethylene, and similar resins, employed in the formation of such coating compositions should constitute from about 10% to about 20% of the weight thereof. The polyethylene, if utilized should have a molecular weight of at least 10,000. Preferably polyethylene, or the like, having a molecular weight from about 10,000 to 15,000 is so employed. The lower limit of 10,000 is critical for the reason that lower molecular weight materials have no significant film forming properties. Polyethylene of extremely high molecular weight cannot readily be dispersed in adequate concentration in the liquid medium of the coating compositions. The polyethylene or similar resin should have a particle size of about 0.2 to 5.9 microns.

Vinyl chloride-vinyl acetate copolymers containing from about 10% to 15% of vinyl acetate and of a molecular weight such that the viscosity range at 20° C. of an 18% solution of the copolymer in methyl iso-butyl ketone is from about 80 to about 150 centipoises are preferred. Those copolymers which form solutions of the aforementioned type which have a viscosity range of 100 to 120 centipoises are particularly suitable.

Copolymers of vinyl and vinylidene chloride which are soluble in chlorinated hydrocarbons and tolerate large dilution with aromatic hydrocarbons can be employed in lieu of vinyl resins.

Hydrocarbon insoluble chlorinated rubbers can also be used. When such materials are employed the incorporation of a small amount of an alkyd resin, such as a medium oil styronate has been found desirable. Appropriate liquid media different from that suitable for the vinyl type resins must be employed.

A particularly appropriate mixed solvent for the production of coating compositions for polyethylene type substrates which compositions include polyethylene and a vinyl resin embraces a mixture of a hydrocarbon medium as a higher boiling fraction and an aliphatic ketone medium as a lower boiling fraction.

The hydrocarbon medium preferably utilized consists primarily of aromatic hydrocarbons which boil within the range of 140° C. to about 200° C. Such hydrocarbon mixtures do not volatilize appreciably during the initial drying step (during which the lower boiling ketone fraction is removed) and prior to phase reversal, but will volatilize substantially completely during the subsequent bonding step following phase reversal.

It is preferred that at least about 25% of the weight of hydrocarbon medium boil at a temperature in excess of 160° C. to provide a quantity of aromatic hydrocarbon in contact with the polyethylene substrate for a time sufficient to effect a softening thereof. Such softening facilitates satisfactory bonding of the coating of the polyethylene base. The presence of a significant amount of a higher boiling fraction of aromatic hydrocarbon also facilitates the separation of the initial drying and final bonding steps which is desirable in the multi-color printing operations. Generally speaking, the hydrocarbon medium should constitute from about 50% to about 75% of the total weight of the polyethylene coating composition. A preferred proportion is from about 60% to about 65%.

The lower boiling fraction of the solvent medium of compositions for coating polyethylene type materials preferably consists of aliphatic ketones. This fraction should constitute from about 15% to about 50% by weight of the coating composition. If a quantity of ketone appreciably less than the lower limit of 15% of the weight of the coating composition is employed an adequate amount of incompatible vinyl resin normally cannot be incorporated. If ketone in an amount substantially greater than the upper limit of 50% of the weight of the coating composition is employed the composition contains insufficient polyethylene. Stated another way, it is preferred that ketones constituting the lower boiling fraction of the solvent medium be present in a weight ratio of 1:1 to 1:5 with respect to the higher boiling hydrocarbon fraction of the medium.

It is preferred that the boiling point of a major portion of the aliphatic ketone fraction of the medium employed in the compositions for coating polyethylene and the like not exceed about 130° C. to the end that the ketones will be substantially completely volatilized prior to volatilization of the hydrocarbon medium. Preferably, ketones boiling within the range of from about 70° C. to 120° C. are employed. Ketones which can be employed include methyl-ethyl ketone, the methyl-isobutyl ketones, diethyl ketone, the ethyl propyl ketones, the dipropyl ketones and the like. Substituted and unsaturated ketones can be employed. Methyl-isobutyl ketone is preferred.

In some instance it is desirable to include in polyethylene coating compositions from about 2% to about 5% by weight of an aliphatic ketone boiling within range of from about 140° C. to about 160° C. to delay phase reversal and retard precipitation of the incompatible resin when it is desirable or necessary to protect the color value of pigments which may be present in such resins. Ketones such as cyclohexanone, methyl amyl ketone, ethyl butyl ketone and the like can be so employed. This expedient is availed of in the formation of inks containing vinyl chloride-acetate copolymers.

An ink dispersion highly suitable for producing a grease-resistant printing on polyethylene contains about 8% to 20% by weight of particular polyethylene having a molecular weight of about 7 to 15 thousand and a particle size of about 0.2 to 5 microns; a mixed solvent containing about 50% to 75% by weight of a liquid hydrocarbon medium boiling within the range of about 140° C. to 200° C., about 15% to 50% by weight of an aliphatic ketone boiling within the range of about 70° C. to 120° C., and 2% to 5% by weight of a ketone boiling within the range of about 140° C. to 160° C.; a pigment and a vinyl resin incompatible with polyethylene and insoluble in straight hydrocarbon solvents, but soluble in such mixed solvent of hydrocarbons and ketones in solution in the liquid phase of said dispersion, in an amount such that the ratio of percent by weight of the vinyl to polyethylene in the ink is from about 1:1.2 to 1:5.

A similar ink dispersion for coating on polyethylene may be prepared by utilizing hydrocarbon insoluble chlorinated rubber in lieu of the vinyl resin and an aliphatic alcohol ester and of aliphatic acid such as butyl acetate in lieu of the ketone.

The coating compositions of this invention may be prepared in any manner known to the art. For example, a polyethylene dispersion may be prepared in any suitable manner, diluted with ketones to render the dispersion compatible with a dispersion of a pigment in a solution of a vinyl resin and the two dispersions blended and homogenized. The polyethylene dispersions may be prepared by forming a solution of a concentrate from 15% to 25% of polyethylene of molecular weight of from 10,000 to 15,000 in aromatic hydrocarbons at a temperature of 90° C. to 110° C., and cooling such solution to a temperature of 0° C. to 40° C. to cause precipitation of the polyethylene.

In this method of preparing the polyethylene dispersion, it is essential that the solution of polyethylene be agitated and cooled from a temperature above the solution temperature at a rate of from about 10° C. to 20° C. per hour. Such cooling should be continued at least until the dispersion reaches a temperature of 40° C. By this means, the polyethylene is formed in the particle size requisite to the obtaining of a workable consistency. It is desirable to maintain the polyethylene solution at a temperature of from about 90° C. to 125° C. for about 30 to 75 minutes prior to cooling to form the dispersion.

In addition to the foregoing ingredients, it is desirable to incorporate a protective colloid during the preparation of the polyethylene dispersion. Such protective colloids may be employed in an amount equal to from about 0.6% to about 1.3% of the weight of the dispersion. The protective colloids are likewise preferably introduced in the form of a solution thereof in a portion of the liquid medium of the ultimate ink dispersion. Any of the conventional protective colloid materials may be employed for this purpose, the preferred colloids including "butyl" rubber, butadiene styrene, copolymer, polyacrylonitriles and similar synthetic rubber type materials. "Butyl" rubber is a generic name applied to vulcanizable elastic copolymers of isobutylene and small amounts of diolefins. Other protective colloids which are not of the synthetic rubber type but which are soluble in the solvent medium employed in the ink may be utilized. The art is well cognizant of the protective colloids which may be so employed.

A somewhat higher concentration of polyethylene in the dispersion and a higher percentage of non-hydrocarbon solutions may be obtained if the polyethylene dispersions are prepared in a dough mixer from a solution containing from about 25% to 50% by weight of polyethylene having a molecular weight of 10,000 to 15,000 in an aromatic hydrocarbon solvent boiling at about 140° C. to 200° C. A solution of a protecting colloid preferably is added and the material worked and cooled to about 0° C. to 40° C. thereby forming a dispersion of the polyethylene in the hydrocarbon.

During the cooling and working process the material is maintained at a dough-like consistency by the addition of small quantities of hydrocarbon solvents until cold. This is not required if polyethylene of a molecular weight of about 12,000 is worked at a concentration of 35%. In this process, cooling rates do not materially effect the quality of the dispersion obtained.

Dispersions prepared by either of these two methods are diluted to attain compatibility with the vinyl resin in solution and to facilitate blending by the addition of solvents to obtain polyethylene concentrations in the range of 15 to 25%. The added solvents are low molecular weight aliphatic ketones and hydrocarbons in proportions such that when the vinyl resin is added with additional ketones the ultimate ratio of weight of ketones to hydrocarbon solvents is from 1:1 to 1:5.

Thereafter, a ketone solution of the oil, fat and hydrocarbon insoluble vinyl resin having pigment dispersed therein is added in an amount such that the percentage by weight of vinyl to polyethylene in the ink is from 1:1.2 to 1:5.

It is possible to prepare inks of the type with which this invention is concerned by starting with polyethylene in particulate form in which the particle size falls within the range of 10 microns and reducing the particle size to about 0.2 to 5 microns by grinding. For example, a satisfactory ink may be prepared by grinding in a pebble mill, a polyethylene in particulate form in which the particles before grinding have the above-specified particle size, with the pigmented vinyl resin solution and a mixed aliphatic ketone-aromatic hydrocarbon medium of the type and in the proportions previously mentioned. Alternatively the ingredients may be introduced stepwise if desired.

The ketone-aromatic solvents blend is a preferred solvent used in the inks of the present invention for use with vinyl chloride-acetate copolymers. However, other solvent combinations may be used with other resins as, for example, butyl acetate-aromatics with chlorinated rubber.

Example I

A hydrocarbon medium consisting of 50 parts of aromatic hydrocarbons boiling within the range of 140° C. to 200° C. and 50 parts of xylene was prepared. 16 parts of polyethylene having a molecular weight of about 10,000 was mixed into 84 parts of this solvent medium, and the resulting mixture heated to a temperature of about 100° C. Apparent solution of the polyethylene took place at 85° C. The polyethylene solution in the aromatic solvent mixture was agitated at a temperature of about 100° C. for about 30 minutes. At this point an amount of protective colloid equal to about 0.8% of the total weight of the polyethylene solution was added thereto. The colloid was "butyl" rubber and was added as a 15% solution in a hydrocarbon solvent boiling within the range of about 80° C. to 100° C. Thereafter the solution was cooled with agitation at the rate of about 10° C. to about 20° C. per hour to a temperature of about 40° C.

After the dispersion containing the protective colloid had been cooled to about 40° C., an amount of methyl-isobutyl ketone equal to about 25% of the dispersion was added with agitation and the resulting mixture homogenized. To 3 parts of this mixture were then added 1 part of a dispersion of a titanium dioxide pigment consisting of 25 per cent by weight of TiO$_2$
20 per cent by weight of VYHH resin (vinyl acetate-chloride copolymer)
30 per cent by weight of methylisobutyl ketone
10 per cent by weight of cyclohexanone The mixture was then again homogenized.

The ink so produced was used to print on a polyethylene surface with conventional printing equipment at room temperature, and, thereafter subjected to a sheet temperature of about 170° F. for a period of about two seconds. In the first stage of the heating step the ketone was substantially completely volatilized and phase reversal of the ink dispersion took place. In the second stage, the less volatile hydrocarbon solvent was volatilized and the polyethylene present in the ink was melted and bonded to the polyethylene surface. Tests with animal and vegetable fats indicated that the printing resulting from the use of this ink was grease-resistant. Furthermore, the ink was not removed from the polyethylene base by conventional stripping tests in which a pressure sensitive adhesive is placed over the printing and then stripped off.

Example II 16 parts of powder derived from polyethylene having molecular weight of about ten thousand and in which the particle size was within the range of 10 to 50 microns were ground simultaneously in a ball mill at 80° F. with 84 parts of the aromatic hydrocarbon solvent mixture described in Example I, 20 parts of methyl isopropyl ketone, 7 parts of cyclohexanone, 8 parts of polyvinyl acetate-chloride copolymer of the type described in Example I, and 4 parts of phthalocyanine blue pigment. The ink so produced was comparable to that described in Example I.

Example III 40 parts of polyethylene molecular weight about 1200
35 parts of xylene
25 parts 85% aromatic solvent—boiling point range 320° to 390° F.

were charged into a jacketed dough mixer and heated to 212° F. Cold water was applied to the jacket and the unit cooled with working.

When the temperature of 100° F. was reached, 100 parts of butyl acetate were gradually added, and after proper mixing, 115 parts of a dispersion containing
20 parts of iron blue
60 parts butylacetate and
15 parts of a 50% solution of a styrene modified alkyd
20 parts of hydrocarbon insoluble chlorinated rubber.

The alkyd prevents excessive flocculation of the chlorinated rubber.

This ink when dried after printing was grease-resistant even before the alkyd was cured.

The following are typical compositions of inks for printing on polyethylene, etc.

(1)

| | Percent |
|---|---|
| Polyethylene, molecular weight 12,000 | 9.5 |
| Pigment (e. g. Watchung red) | 4.9 |
| VYHH resin (as described in Example I) | 4.1 |
| Butyl rubber | .6 |
| Methyl-ethyl ketone | 11.5 |
| Methyl isopropyl ketone | 18.4 |
| Aromatic hydrocarbon (boiling range 140° C. to 200° C.) | 51.0 |
| | 100.0 |

This ink was usable as is, however, the addition of 5% of cyclohexanone resulted in improved color value and gloss.

(2)

| | Percent |
|---|---|
| Polyethylene, molecular weight 12,000 | 9.0 |
| Butyl rubber | .6 |
| VYHH resin (as described in Example I) | 4.4 |
| Pigment (rutile TiO$_2$ white) | 12.0 |
| Methyl ethyl ketone | 20.0 |
| Cyclohexanone | 5.0 |
| Aromatic | 49.0 |
| | 100.0 |

The coating composition and inks of this invention adhere strongly to the substrates to which they are applied. As a consequence of the utilization in the compositions of the invention of resins which are not necessarily compatible with the substrate, substantially any desired physical properties may be imparted to the films ultimately formed. This invention accordingly makes possible the production on surfaces having selective adhesive properties of films which demonstrate substantially any desired characteristics.

It will be appreciated that the invention embraces generically coating compositions of the type hereinbefore described. While the coating compositions have been described with particular reference to polyethylene the invention is not restricted to polyethylene, but is generically embracive of all compositions and processes for the utilization thereof which are attended by the unique characteristics such as phase reversal which serve to distinguish the compositions of the invention from the prior art. These characteristics are fundamentally physical in nature and do not rely upon chemical reaction.

What I claim is:

1. A coating composition for a normally solid hydrocarbon polymer surface consisting essentially of a mixed solvent medium having a higher boiling fraction and a lower boiling fraction, a first resin dispersed in particulate form in said medium, and a second resin in solution in said medium; said first resin being compatible with the normally solid hydrocarbon polymer surface to be coated, and soluble in the higher boiling fraction of said medium at an elevated temperature, said second resin being incompatible with the normally solid hydrocarbon polymer surface to be coated, insoluble in the higher boiling fraction of said medium at any temperature, and soluble in said medium and in the lower boiling fraction thereof at a temperature substantially below that requisite to solution of said first resin in the higher boiling fraction of said medium, the boiling point differential between said higher boiling fraction and said lower boiling fraction of the solvent medium being at least about 10 centigrade degrees, said first resin being polyethylene having a molecular weight of at least 10,000 and a particle size of about 0.2 to about 5.0 microns; said second resin being selected from the group consisting of the oil, fat and hydrocarbon insoluble vinyl resins and chlorinated rubber; the weight ratio of said second resin to said first resin falling within the range of about 1:1.2 to 1:5.

2. The coating composition of claim 1 in which the first resin is soluble in the higher boiling fraction of the mixed solvent medium at an elevated temperature only and is insoluble in said medium and in the lower boiling fraction thereof.

3. The coating composition of claim 1 in which the second resin is a vinyl acetate-vinylchloride copolymer having a molecular weight in excess of 10,000.

4. The coating composition of claim 1 in which the higher boiling fraction of the solvent medium boils at a temperature of about 140° C. to about 225° C. and in which said higher boiling fraction constitutes from about 50% to about 75% of the total weight of the coating composition.

5. The coating composition of claim 4 in which the higher boiling fraction of the solvent medium consists essentially of aromatic hydrocarbons.

6. The coating composition of claim 5 in which the lower boiling fraction of the solvent medium consists essentially of aliphatic ketones which boil at a temperature of about 100° C. to about 130° C. and in which said lower boiling fraction constitutes from about 15% to about 50% of the total weight of the coating composition.

7. The coating composition of claim 1 containing a pigment.

8. A coating material for a normally solid hydrocarbon polymer surface comprising a first resin incompatible with the substrate and in solution at room temperature in a mixed solvent having low boiling and high boiling fractions, a second resin more compatible with the substrate and finely dispersed in said solution at room temperature, said second resin being soluble in the high boiling fraction of the solvent at a second temperature which is higher than said first temperature and wherein the first resin is insoluble in said high boiling solvent component at the second temperature, said first resin being selected from the group consisting of the oil, fat, and hydrocarbon insoluble vinyl resins and chlorinated rubber, said second resin being polyethylene having a molecular weight of at least 10,000 and a particle size of about 0.2 to about 5.0 microns; the weight ratio of said first resin to said second resin falling within the range of about 1:1.2 to 1:5.

9. The coating composition of claim 1 in which the second resin is incompatible with the first resin and the normally solid hydrocarbon polymer surface to be coated.

10. A grease-resistant ink for printing on polyethylene consisting essentially of 8% to about 20% by weight of particulate polyethylene having a molecular weight of about 10,000 to 15,000 and a particle size of about 0.5 to 2 microns; a mixed solvent containing about 50% to 75% by weight of a liquid hydrocarbon medium boiling within the range of about 140° C. to about 200° C., about 15% to 50% by weight of an aliphatic ketone boiling within the range of about 70° C. to about 120° C., and 2% to 5% by weight of a ketone boiling within the range of about 140° C. to about 160° C.; a pigment and a vinyl resin incompatible with polyethylene and insoluble in straight hydrocarbon solvents, but soluble in said mixed solvent of hydrocarbons and ketones, in solution in the liquid phase of said dispersion, the ratio of parts by weight of said vinyl resin to said particulate polyethylene falling within the range of from about 1:1.2 to 1:5.

11. The ink of claim 10 in which at least about 25% of the hydrocarbon medium boils at a temperature in excess of 160° C.

12. The ink of claim 10 in which the vinyl resin is a copolymer of vinyl chloride and vinyl acetate having a molecular weight in excess of 10,000.

13. The process which comprises forming a dispersion of particulate polyethylene having a molecular weight of about 7,000 to 15,000 and a particle size of about 0.2 to 5 microns in a hydrocarbon medium boiling at a temperature of about 140° C. to 200° C. adding to the dispersion so formed a low molecular weight aliphatic ketone containing a pigment and an oil, fat and hydrocarbon insoluble vinyl resin having a molecular weight in excess of 10,000 the materials being so proportioned that the dispersion produced contains from about 8% to 20% by weight of polyethylene, from about 15% to 50% by weight ketone, and vinyl resin in an amount requisite to provide a ratio of parts by weight thereof to polyethylene of from about 1:1.2 to 1:5.

14. A process which comprises forming a dispersion of particulate polyethylene having a molecular weight of about 7,000 to about 15,000 and a particle size of about 0.2 to 5 microns in a medium comprising a mixture of hydrocarbons and up to about 40% by weight of an aliphatic ketone boiling at a temperature of from about 140° to about 200° C., adding to the dispersion so-formed a low molecular weight aliphatic ketone containing a pigment, and an oil, fat and hydrocarbon insoluble vinyl resin having a molecular weight in excess of 10,000, the materials being so proportioned that the dispersion produced contains from about 50% to about 75% of said medium, about 8 to about 20% by weight of polyethylene and vinyl resin in an amount requisite to provide a ratio of parts by weight thereof to polyethylene from about 1:1.2 to about 1:5.

15. The process for preparing an ink dispersion for printing on polyethylene which consists essentially of forming at a temperature within the range of about 90° C. to about 125° C. a solution containing from about 12% to about 20% by weight of polyethylene having a molecular weight of about 7,000 to 15,000 in a hydrocarbon solvent boiling at a temperature of about 140° C. to 200° C., adding a protective colloid agitating and cooling said solution at a rate of about 10° C. to 20° C. per hour to a temperature of about 20° C. to 60° C. to form a dispersion of polyethylene in said hydrocarbon solvent, and thereafter adding with agitation a quantity of aliphatic ketones adequate to provide a weight ratio of ketones to hydrocarbons of about 1:1 to 1:5, the major portion of the ketones being of low molecular weight, there having been dissolved in at least a portion of said ketones a quantity of an oil, fat and hydrocarbon insoluble vinyl resin such as to provide a ratio by weight of said vinyl resin to polyethylene in said dispersion of from about 1:1.2 to about 1:5, said vinyl resin having a molecular weight of from about 10,000 to 15,000 a pigment being dispersed in the vinyl resin solution.

16. The process of claim 15 wherein the vinyl resin employed is a copolymer of vinyl chloride and vinyl acetate.

17. The process which comprises working and dispersing particulate polyethylene having a molecular weight of about 10,000 to 12,000 and a pigment in a solution of an oil, fat and hydrocarbon insoluble vinyl resin in a low molecular weight aliphatic ketone and hydrocarbon solvents at a boiling point range of from 140° C. to 200° C. until the particle size of the polyethylene is below 5 microns, the materials being so proportioned that the ink dispersion produced contains from about 8% to 20% by weight of polyethylene, from about 50% to 75% of hydrocarbon medium, from about 15% to 50% by weight ketones, and the oil insoluble resin in an amount requisite to provide a ratio of parts by weight thereof to polyethylene of from about 1:1 to 1:5.

18. A polyethylene surface having a grease-resistant coating consisting of at least two uncured resins bonded thereto, one of said resins being a polyethylene having a molecular weight of at least 10,000 and the other of said resins being selected from the group consisting of the oil, fat and hydrocarbon insoluble vinyl resins and chlorinated rubber; the ratio of parts by weight of the resin selected from the group consisting of the oil, fat and hydrocarbon insoluble resins and chlorinated rubber to the polyethylene in said coating falling within the range of from about 1:1.2 to about 1:5.

19. A polyethylene surface having a grease-resistant coating consisting of an oil, fat and hydrocarbon insoluble vinyl resin bonded to said surface by polyethylene having a molecular weight of at least 10,000; the ratio of parts by weight of said vinyl resin to said polyethylene in said coating falling within the range of from about 1:1.2 to about 1:5.

20. A polyethylene surface having a grease-resistant coating consisting of a vinyl acetate-vinyl chloride copolymer bonded to said surface by polyethylene having a molecular weight of at least 10,000; the ratio of parts by weight of said copolymer to said polyethylene in said coating falling within the range of from about 1:1.2 to about 1:5.

21. A dispersion for coating polyethylene consisting essentially of particulate polyethylene having a molecular weight of about 10,000 to 15,000 and a particle size of from about 0.2 to about 5.0 microns, from about 50% to about 75% by weight of a liquid hydrocarbon medium boiling at a temperature of from about 140° C. to about 200° C., at least 25% by weight of said medium boiling at a temperature in excess of 160° C., and about 15% to about 50% by weight of an aliphatic ketone boiling within the range of about 70° C. to about 120° C., a pigment, and a resin selected from the group consisting of the oil, fat and hydrocarbon insoluble vinyl resins and chlorinated rubber insoluble in straight hydrocarbon solvents in solution in the liquid phase of said dispersion; the ratio of parts by weight of said resin selected from the group consisting of the oil, fat and hydrocarbon insoluble vinyl resins and chlorinated rubber to said particulate polyethylene falling within the range of from about 1:1.2 to about 1:5.

SERGE A. LOUKOMSKY.

REFERENCES CITED

The following references are of record in the file of this patent:

UNITED STATES PATENTS

| Number | Name | Date |
| --- | --- | --- |
| 2,518,462 | Gowing | Aug. 15, 1950 |
| 2,530,738 | Spessard | Nov. 21, 1950 |

FOREIGN PATENTS

| Number | Country | Date |
| --- | --- | --- |
| 613,018 | Great Britain | Nov. 22, 1948 |